(12) United States Patent
Hastings et al.

(10) Patent No.: US 6,772,251 B1
(45) Date of Patent: Aug. 3, 2004

(54) BIT INTERLEAVED DATA SERIAL INTERFACE

(75) Inventors: Mark E. Hastings, Mukilteo, WA (US); Timothy E. Nelson, Bothell, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 407 days.

(21) Appl. No.: 09/849,214

(22) Filed: May 4, 2001

(51) Int. Cl.[7] .............................................. G06F 13/00
(52) U.S. Cl. ...................... 710/100; 710/305; 375/354
(58) Field of Search ................................ 710/100, 300, 710/305, 307; 713/400; 375/220, 257, 354, 355, 503, 520, 358, 438

(56) References Cited

U.S. PATENT DOCUMENTS

| | | | |
|---|---|---|---|
| 4,689,740 A | | 8/1987 | Moelands |
| 4,847,867 A | * | 7/1989 | Nasu et al. ................. 375/257 |
| 4,964,141 A | * | 10/1990 | Matsushima et al. ....... 375/354 |
| 5,048,061 A | * | 9/1991 | Hubert ........................ 375/362 |
| 5,559,502 A | | 9/1996 | Schutte |
| 5,689,196 A | | 11/1997 | Schutte |
| 6,047,021 A | * | 4/2000 | Grimes et al. .............. 375/220 |

FOREIGN PATENT DOCUMENTS

| | | |
|---|---|---|
| WO | WO 96/17305 | 6/1996 |
| WO | WO 98/34376 | 8/1998 |
| WO | WO 99/09712 | 2/1999 |

* cited by examiner

*Primary Examiner*—Khanh Dang
(74) *Attorney, Agent, or Firm*—Wagner, Murabito & Hao LLP (57) ABSTRACT

A shared wire serial interface between two devices that share a system clock and a single bi-directional serial data line. The clock drives both the system and the interface and is provided over a single clock wire. One device operates as a master, the other as a slave. Since master and slave share the same clock, clock drift error will be zero. Although the start of a data transfer is asynchronous with regard to the system clock, the data transfer itself, is synchronous. In one embodiment, the bit transfer rate is $\frac{1}{8}^{th}$ the system clock speed in one example and is generated by a state machine, however, any divide may be used. The state machine also signals the output enablers which interleave the data bits on the serial data line. The flow of data on a single data line of the interface is bi-directional in that data from the master is bit interleaved with data from the slave. Due to the bit interleaving of data between master and slave, the master can simultaneously shift a command out of its register while shifting in a reply from a previous command. A one bit tri-state period separates each data bit.

20 Claims, 10 Drawing Sheets

INTERFACE BLOCK DIAGRAM

FIGURE 1
INTERFACE BLOCK DIAGRAM

FIGURE 2

FIGURE 3
SERIAL DATA TIMING

FIGURE 7A
WRITE FLOWCHART

FIGURE 7B

FIGURE 8A
READ FLOWCHART

FIGURE 8B

BIT INTERLEAVED DATA SERIAL INTERFACE

FIELD OF THE INVENTION

Embodiments of the present invention relate to a communication interface between two devices. More specifically, the present invention pertains to a bi-directional serial interface which may interleave the data bits sent between a master device and a slave device.

BACKGROUND OF THE INVENTION

Electronic devices may communicate using bus architectures. There are serial and parallel bus architectures. The $I^2C$ bus is one conventional communication bus for electronic devices. In this bus, there are two wires connecting a plurality of devices. One wire is the clock bus, the other is the data bus. The data is sent in eight-bit bytes across the data bus. While the $I^2C$ bus offers advantages over its predecessors in simplicity of design, reduced pin count, and low noise distortion, it is still not optimized for some forms of data transfer. By using eight-bit bytes, the flow of data is characterized by a series of starts and stops as the receiving circuitry clears the bytes of data. Importantly, data is sent serially in groups of bytes over the bus. In other words, while a byte is being transferred over a wire, no other transfer can take place until the byte transfer is complete.

Another conventional serial communication interface is the serial peripheral interface (SPI). The SPI has two data lines, one going out from the master into the slave, and one going out from the slave into the master, as well as a clock line and a chip select wire. This communication interface offers the advantage of enabling two-way communications. Its disadvantage is that the circuit is complicated by the greater number of wires needed.

It would be advantageous, then, to provide a system which combines the advantages of a simple architecture with the ability to conduct two-way simultaneous communications. The present invention provides a solution to meet the above needs.

SUMMARY OF THE INVENTION

Accordingly, the present invention allows for simultaneous bi-directional communication between two devices while providing a single data line interface architecture. By bit interleaving the data from the two devices over this single data line, data can be shifted into the registers while commands are being shifted out over a common data line. In situations where the commands to the slave are primarily read operations, there are far fewer starts and stops in the data flow. These and other objects and advantages of the present invention and others not specifically recited above will be described in more detail herein.

Embodiments of the invention are directed to a shared wire serial interface between two devices that share a system clock and a single bi-directional serial data line. The system clock drives both the system and the interface, and is provided over a single clock wire. One device operates as a master, the other as a slave. Since the master and slave share the same clock, clock drift will be zero. Although the start of a data transfer is asynchronous with regard to the system clock, the data transfer itself may be synchronous. In one embodiment, the bit transfer rate is a multiple of the system clock speed e.g., $\frac{1}{8}^{th}$, and is generated by a state machine, however, any multiple may be used. The state machine also signals the output enablers which interleave the data bits on the serial data line. The flow of data on a single data line of the interface is bi-directional in that data from the master may be bit interleaved with data from the slave. Due to the bit interleaving of data between master and slave, the master can simultaneously shift a command out of its register while shifting in a reply from a previous command. A one bit tri-state period separates each data bit.

More specifically, the present invention provides a system for performing bit interleaved communication between two devices. The devices have an interface of a single bi-directional serial data line and a single system clock line. Output enablers on both devices interleave the data bits in conjunction with a common system clock. A clock divider on each device regulates the transfer and reception of bit data between shift registers, which transfer data bytes to and from a memory area. In the present embodiment, the clock divider regulates this transfer at a multiple of the system clock frequency e.g., $\frac{1}{8}^{th}$ of the system clock. Each of the interleaved bits is followed by a tri-state period which is one bit time in duration.

DETAILED DESCRIPTION OF THE INVENTION

In the following detailed description of the present invention, a bit interleaved data serial interface having a single bi-directional data line, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
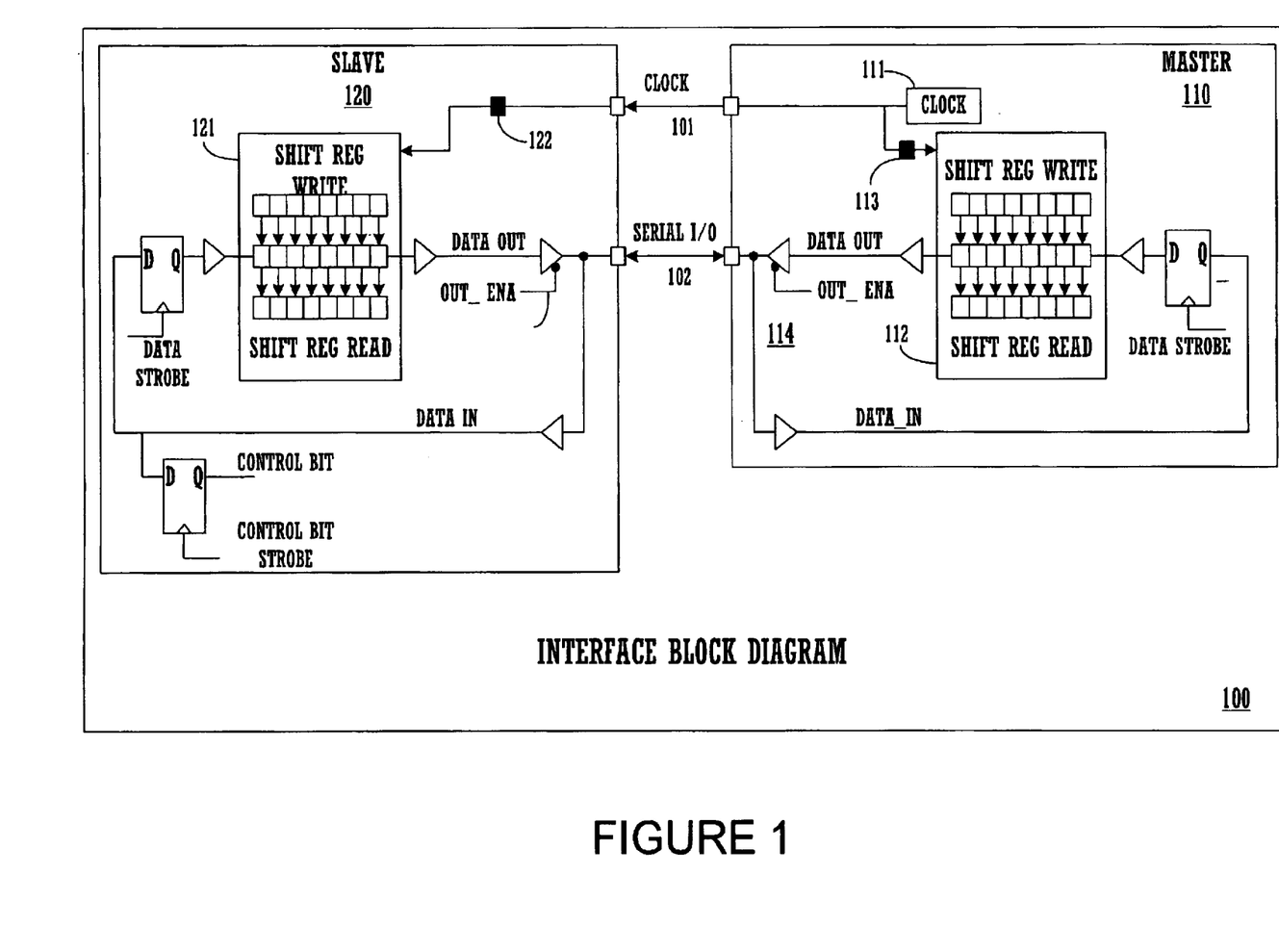
FIG. 1 illustrates an interface block diagram for an embodiment of the present invention.

FIG. 1 is a block diagram of the communication interface of the present invention. In the present embodiment, interface 100 comprises a system clock line 101, and a single serial data line 102. It should be noted that serial data line 102 is operable for bi-directional data transfer. Interface 100 includes a master device 110, comprising a system clock 111 coupled with clock line 101 for regulating all operations carried out by interface 100. The master 110 also contains a shift register 112 for transmitting and receiving bit interleaved data and transferring byte data in parallel to and from a memory area (not shown), and clock divider 113, coupled with system clock 111 and shift register 112, for dividing down the clock frequency from system clock 111 to regulate bit interleaved data communications to and from shift register 112. Master device 110 is further comprised of output enabler 111, coupled with serial data line 102 and shift register 112 for controlling bit interleaved data transmission and reception for shift register 112.

Slave device 120 of FIG. 1 includes a shift register 121 for transmitting and receiving bit interleaved data and transferring byte data in parallel to and from a memory area (not shown). Device 120 also contains a clock divider 122, coupled with system clock line 101 and shift register 121, for dividing down the clock frequency from system clock line 101 to regulate bit interleaved data communications to and from shift register 121. Device 120 also contains an output enabler 123, coupled with serial data line 102 and shift register 121, for controlling bit interleaved data transmission and reception for shift register 121.

Figure 2:
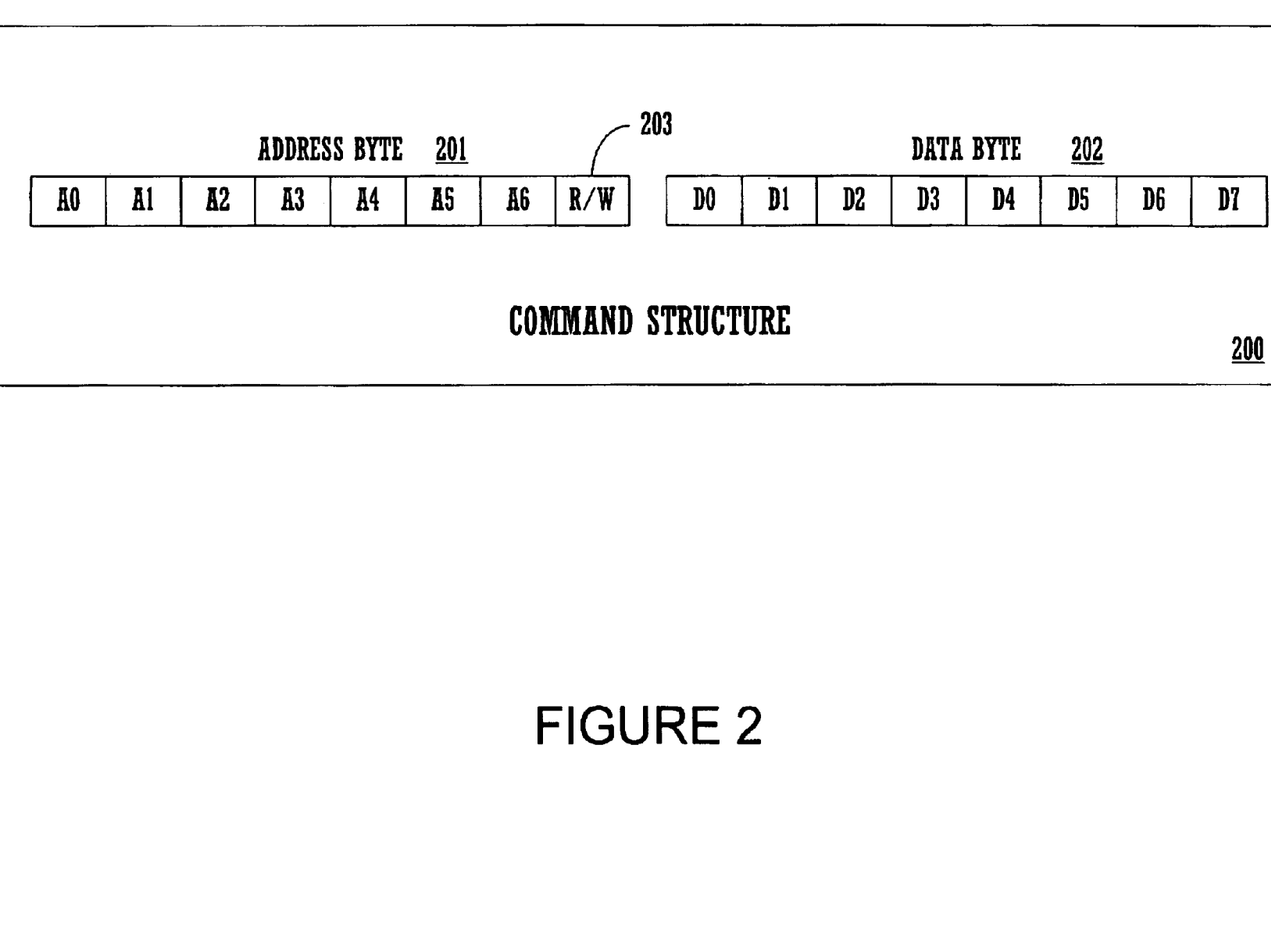
FIG. 2 illustrates an embodiment of the present invention which shows the basic command structure, used by the interface of FIG. 1.

FIG. 2 shows a command structure 200 having two parts including an address byte 201 portion and a data byte 202 portion in accordance with the serial interface of the present invention. Address byte 201 is comprised of seven address bits (A0–A6) indicating a memory location, and a read/write bit 203. Read/write bit 203 indicates whether slave device 120 is supposed to read from the seven-bit memory location or to write to it. For instance, when read/write bit 203 is high (Read), master 110 is requesting a data read from slave 120. If read/write bit 203 is low (Write), master 110 will write a byte to slave 120. Data byte 203 is simply an eight-bit byte of data, either written to or read from a memory location in slave 120.

Figure 3:
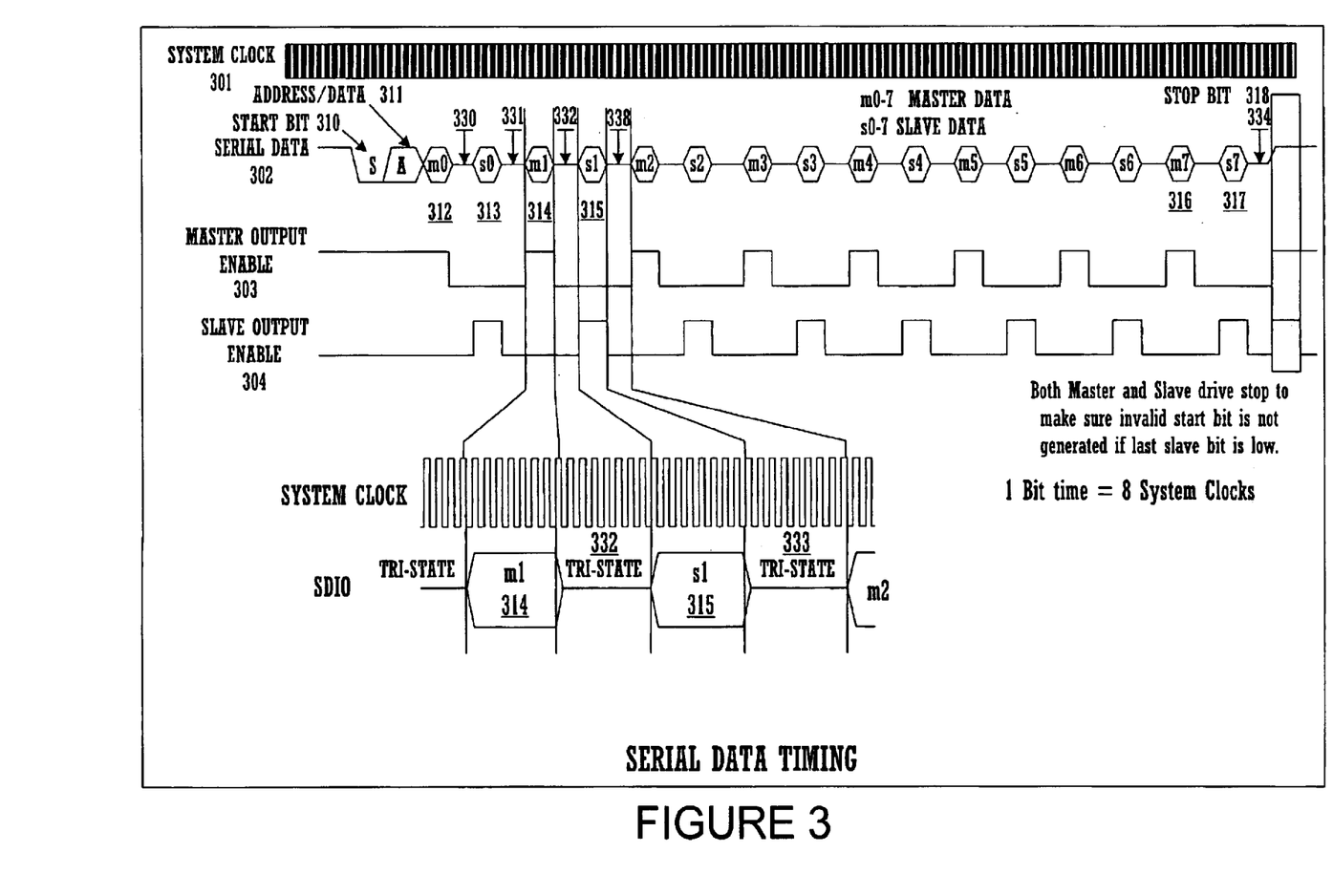
FIG. 3 illustrates a serial data timing diagram, in accordance with an embodiment of the present invention.

FIG. 3 illustrates timing diagrams which describe the relationship between master 110 and slave 120 when driving serial data line 102 in one embodiment of the present invention. FIG. 3 shows the system clock signal 301, the serial data signal 302, the master output enable signal 303, and the slave output enable signal 304. All signals should be referenced to the rising edge of system clock signal 301. When master output enable signal 303 is high, master device 110 is driving serial data line 102 and can pass a data bit to slave device 120. When slave output enable signal 304 is high, slave device 120 is driving serial data line 102 and can pass a data bit to master device 110. It is appreciated that one bit time equals 8 system clocks in this example.

Serial data signal is further comprised of start bit 310, address/data bit 311, data bits 312, 313, 314, 315, 316, 317, and stop bit 318. Tri-state periods 330, 331, 332, 333, and 334 are shown as well.

Still referring to FIG. 3, prior to a command being sent, master device 110 is driving the serial data signal 302 high on data line 102. This is the normal system state when no communications are initiated. A low signal from master device 110 indicates start bit 310. Address/data bit 311 follows, indicating whether the following byte is an address or data. Address/data bit 311 is followed by bit 312 from master device 110. Then, there is a one bit tri-state time period 330 where neither master 110 nor slave 120 drives data line 102. During tri-state period 330, data line 102 is tri-stated which means a signal is sent which will not be interpreted as a high or low signal by either master 110 or slave 120. Tri-state period 330 allows master 110 and slave 120 to have some clock skew without both of them driving serial data line 102 at the same time. It has the same bit length as all other bits to simplify the hardware design.

After tri-state period 330, slave bit 313 is sent to master device 110. This is followed by tri-state period 331 and master bit 314. This pattern of interleaved bits from master device 110 and slave device 120 separated by tri-state periods is continued until the final bit (slave bit 317) is sent. This is followed by tri-state period 334. Then, master output enable signal 303 and slave output enable signal 304 both drive serial data line 102 high which generates stop bit 318. At this point, master device 110 again drives the serial data signal 302 high until another command needs to be sent.

Slave 120 drives the stop bit in conjunction with master 110 to ensure that it does not interpret the last data bit, if low, as a start bit and looping indefinitely. This could occur if master device 110 is not ready yet. In one embodiment of the present invention, data from master 110 and slave 120 is sent starting with the least significant bit. Master bit 312 ("m0") is followed by slave bit 313 ("s0"), then master bit 314 ("m1"), slave bit 315 ("s1"), . . . , master bit 316 ("m7"), slave bit ("s7").

Figure 4:
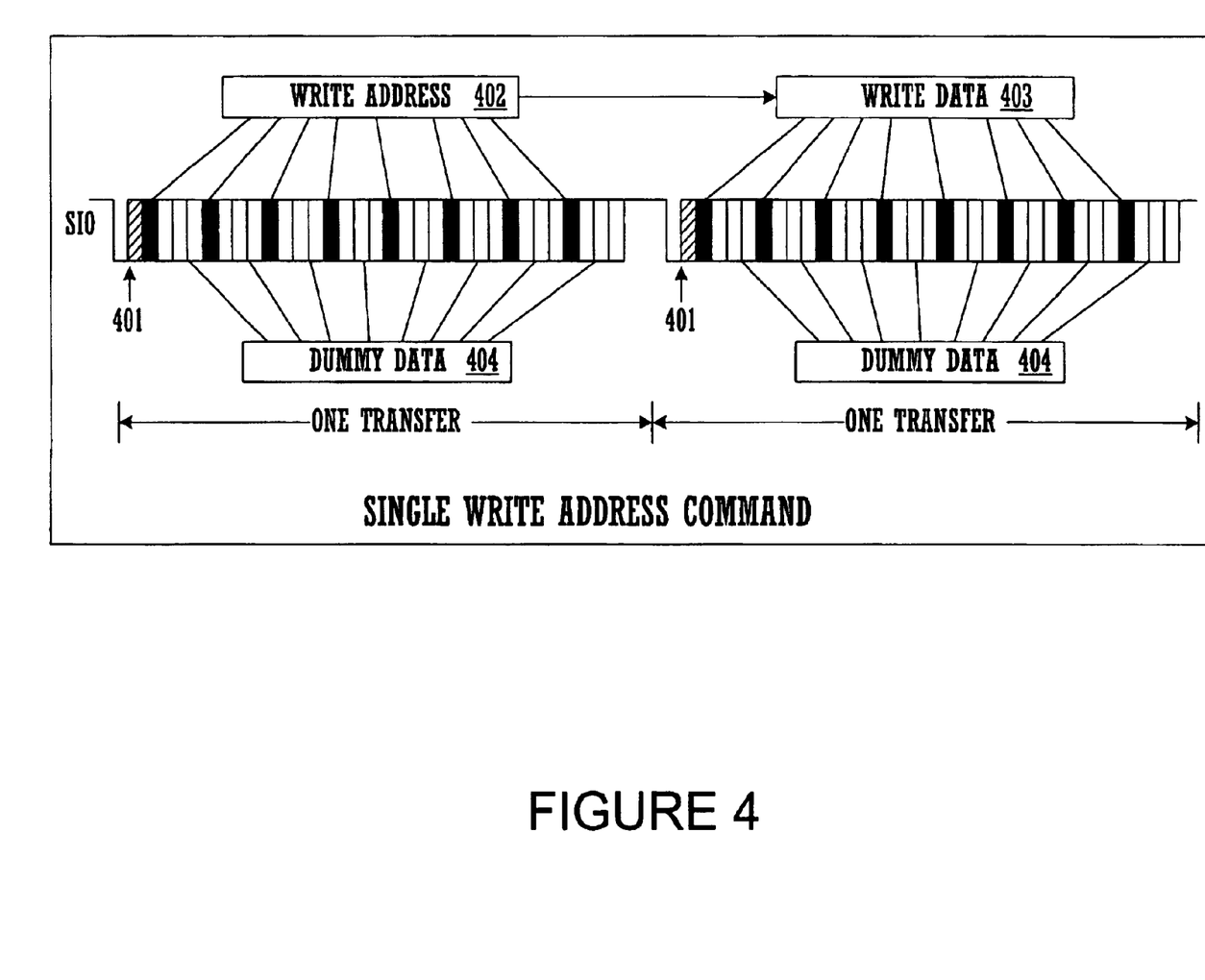
FIG. 4 illustrates a single write address command in accordance with an embodiment of the present invention.

FIG. 4 shows a sequence 400 of a single write command. An address/data indicator bit 401 is sent by master 110 to inform slave 120 whether the data being sent is an address or data. For example, if master 110 sends a command to write to a register in slave 120, it will first send write address 402, then write data 403 in the next transfer sequence. Within write address 402 is a read/write bit which indicates what operation is taking place. For write sequence 400, this bit will be set low ("0"). Slave 120 will put write data 403 in the memory location designated by write address 402. Anytime the read/write bit signals an address, slave 120 will ignore any previous write command. If two consecutive write address commands are sent, the first write address command will be ignored and only the second write command will be carried out. If a read address command follows a write address command, the write address command will be ignored. See Table 1 of FIG. 5 for examples of transfer sequences.

As shown in FIG. 4, it should be noted that since bit interleaving is supported, while address or data bits are being shifted out of master register 112, data bits are simultaneously being shifted in from slave device 120. This could represent data from a prior read command or, in an instance where there has not been any prior command, this could be dummy data as shown in FIG. 4, or information such as chip status or power down status. Slave 120 always has something sent to master 110, whether it is genuine data or dummy data. This keeps the design of the state machine simpler.

Figure 5:
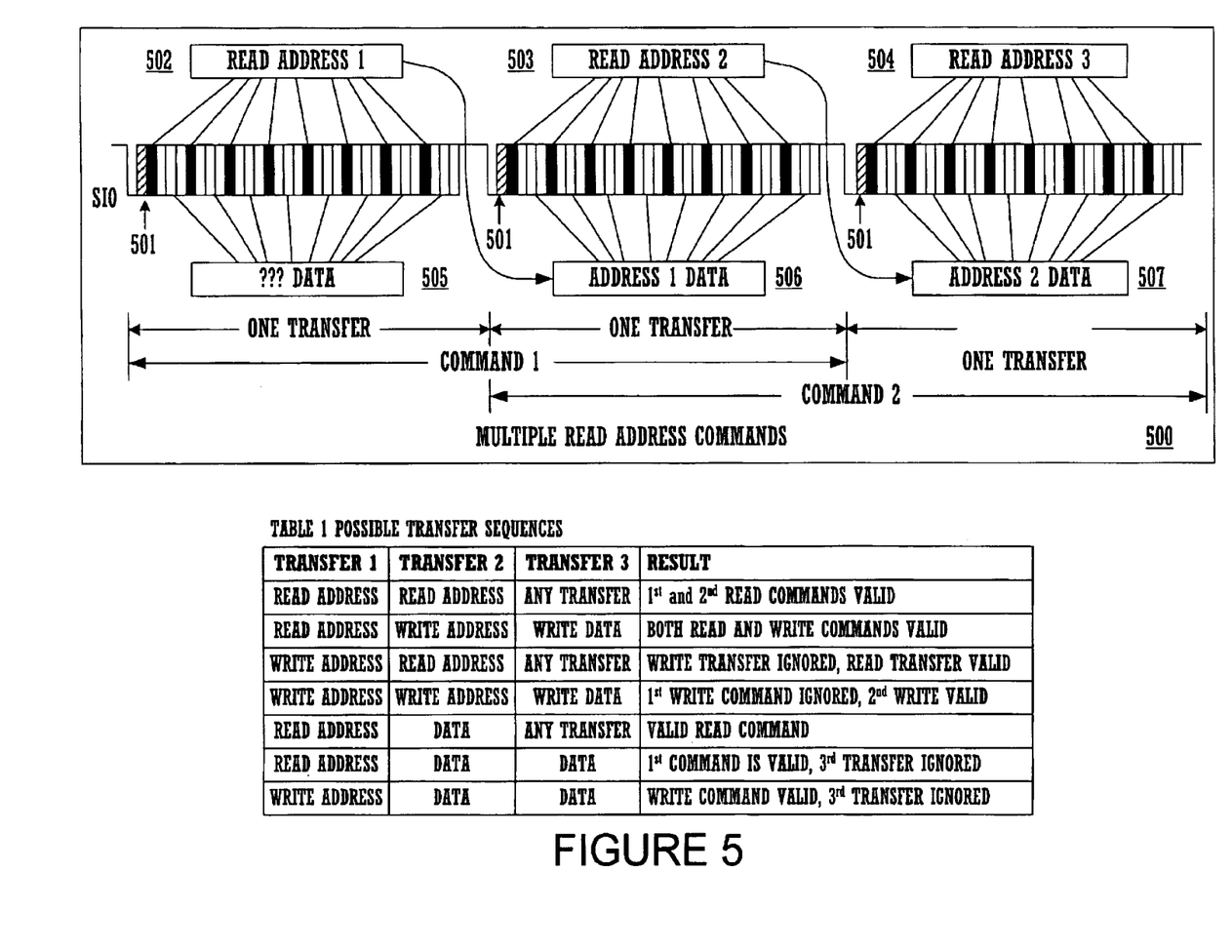
FIG. 5 is a timing diagram of multiple read address commands in accordance with an embodiment of the present invention.

FIG. 5 shows a sequence 500 involving multiple read address commands and bit interleaving. A read address command is always valid, and read address commands may be sent back to back. While subsequent commands are being shifted out of master register 112, data from prior commands is being shifted in.

Still referring to FIGS. 1 and 5, master device 110 sends an address indicator bit 501 to slave device 120. Address indicator bit 501 tells slave device 120 that an address byte is following. Master device 110 then sends an eight bit address byte to slave device 120. This byte is bit interleaved with data byte 505 from slave 120 and tri-state bit periods. Within the address byte sent by master device 110 is a read/write bit. This bit tells slave device 120 to read from the memory address which master device 110 has just sent. Slave device 120 will place data 506 from this address into its register and send it to master device 110 in the next data transfer.

Master device 110 then sends read address 503 to slave device 120. Again, this read address contains a read/write bit which tells slave device 120 that a read operation is taking place. Read address 503 is bit interleaved with data 506 from slave device 120 and tri-state bit periods. Data 506 is the data requested by master device 110 in the previous data transfer. Slave device 120 will take address data 507 from the memory address designated by read address 503 and place it in its shift register. This data byte will be sent to master device 110 in the next data transfer.

Still in reference to FIG. 5, master device 110 sends read address 504 to slave device 120. Within this read address is a read/write bit which tells slave device 120 that a read operation is taking place. Address 504 is bit interleaved with address data 507 from slave device 120 and tri-state bit periods. Data 507 is the data requested by master device 110 in a previous data transfer. Slave device 120 will take data from the memory address indicated by read address 504 and place it in its registers. This data will be sent to master device 110 in the next data transfer.

This process can continue until there are no further read commands to be sent from master device 110. When reading bytes from slave 120, master 110 is always one byte ahead. It will be sending the address for byte (n+1) as it is reading interleaved data for byte (n). See Table 1 of FIG. 5 for more examples of transfer sequences.

Figure 6:
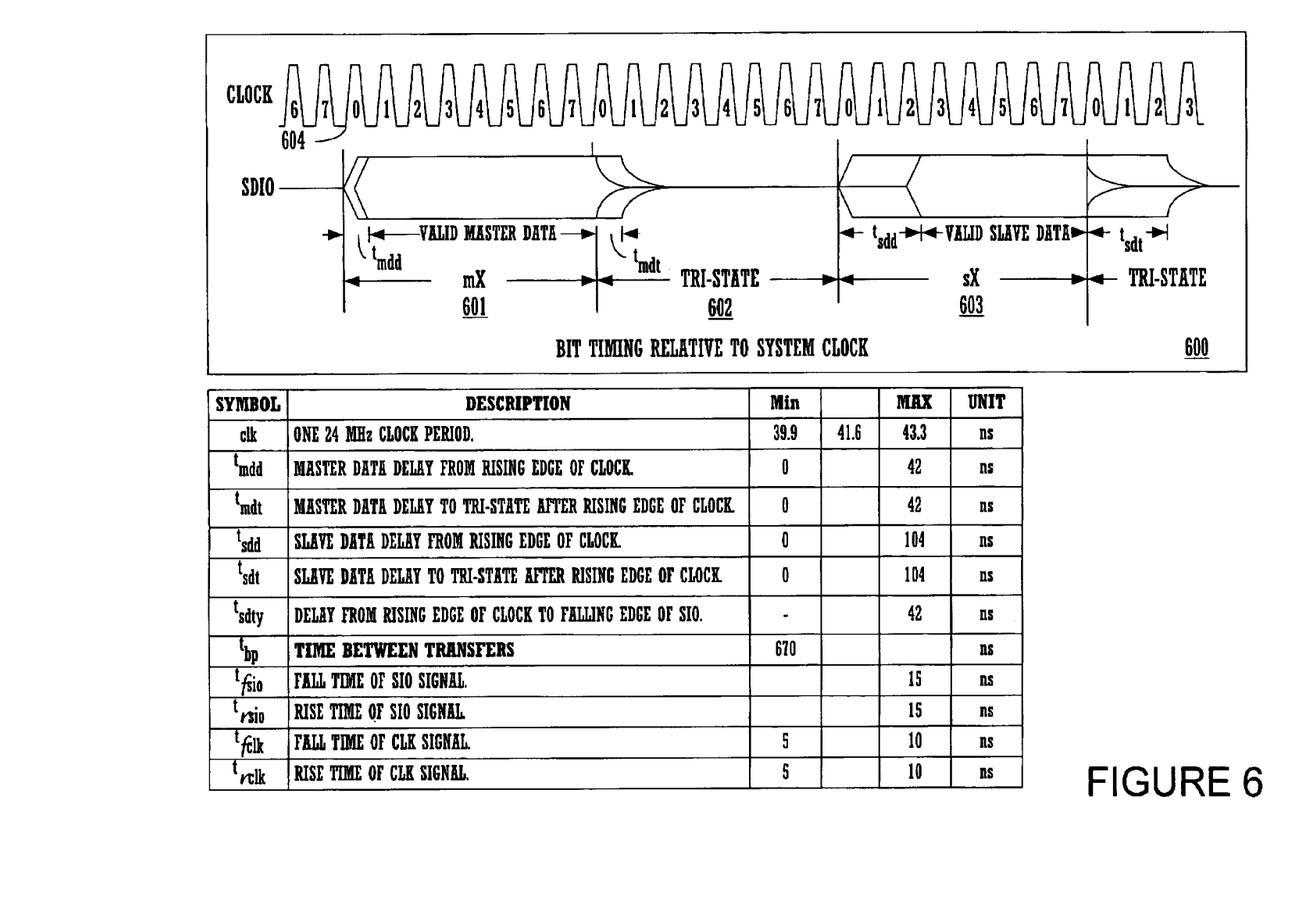
FIG. 6 is a timing diagram of a sequence of bit timing relative to the system clock in accordance with an embodiment of the present invention.

FIG. 6 is a timing diagram showing a sequence 600 of bit timing relative to system clock 111. One master bit 601, a tri-state period 602, and a slave bit 603 are shown. In this illustration, all transitions are clocked on the rising edge of system clock 111. Clock divider 113 regulates shift register 112 by dividing the clock frequency by eight in one example. Beginning at clock 0 (604), the first bit is sent. The signal skew shown in master byte 601 ($t_{mdd}$) shows the difference between the time the data is output and the time the data signal becomes valid. This signal skew is caused by the time it takes the transceivers to drive the signal, as well as having the signal pass through the shift register and buffers. This is followed by several clock cycles of valid master data where sampling can occur. Slave device 120 can account for the skew in the signal and sample accordingly. Slave device 120 could be designed to account for some of this by assuming that the master data bit is detected one bit late. The skew ($t_{mdt}$) between the clock pins and the falling edge of master data bit 601 should be one clock period or less. This accounts for both clock skew and fall time. The valid data from slave device 120 may lag an additional one and one half clock periods.

Slave device 120 generally sees a slightly delayed clock and data signal relative to master device 110. Assuming that slave device 120 uses system clock 111 for sampling master data bit 601, it may sample master data bit 601 almost one full clock time after the actual fall of the start bit. Adding to this the additional rise/fall time of the output of the pin driver, valid slave data should be no more than 2.5 clock cycles behind ($t_{sdd}$). Even with worst case delays, there should be ample guard band for sampling by both the slave and master. As seen in FIG. 6, the valid sampling range for slave data bit 603 is at least 5 clock cycles wide.

In one instance, slave 120 could sample the signal and see no data from master 110. Then, in a short interval after slave 120 has sampled the signal, master 110 could have sent a bit. The slave byte shows greater skew because it includes up to one clock bit of skew from master 110, and skew induced by sending a signal back to master 110. However, even with the skew from slave 120, there is still a relatively long amount of time to sample the slave bit. In fact the data could be sampled very reliably from the edge of clock 0 as there is never any negative skew. This will provide the advantage of simplifying the state machine even further.

As can be seen in FIG. 6 the tri-state period 602 allows for the signal skew, and prevents having both master 110 and slave 120 from driving data line 102 concurrently.

Figure 7A:
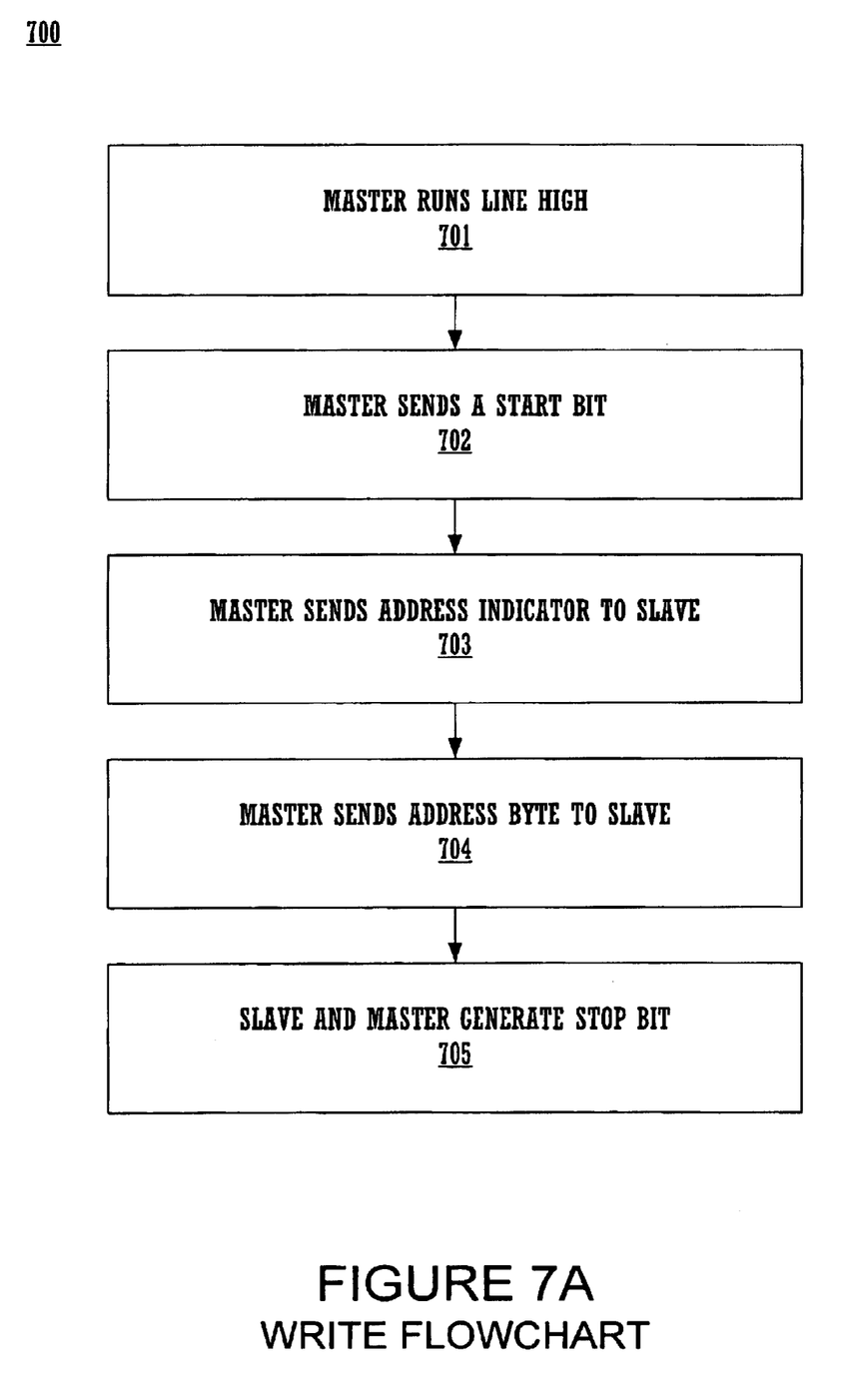
FIGS. 7A and 7B are a flowchart of steps involved in a single write address command in accordance with an embodiment of the present invention.
Figure 7B:
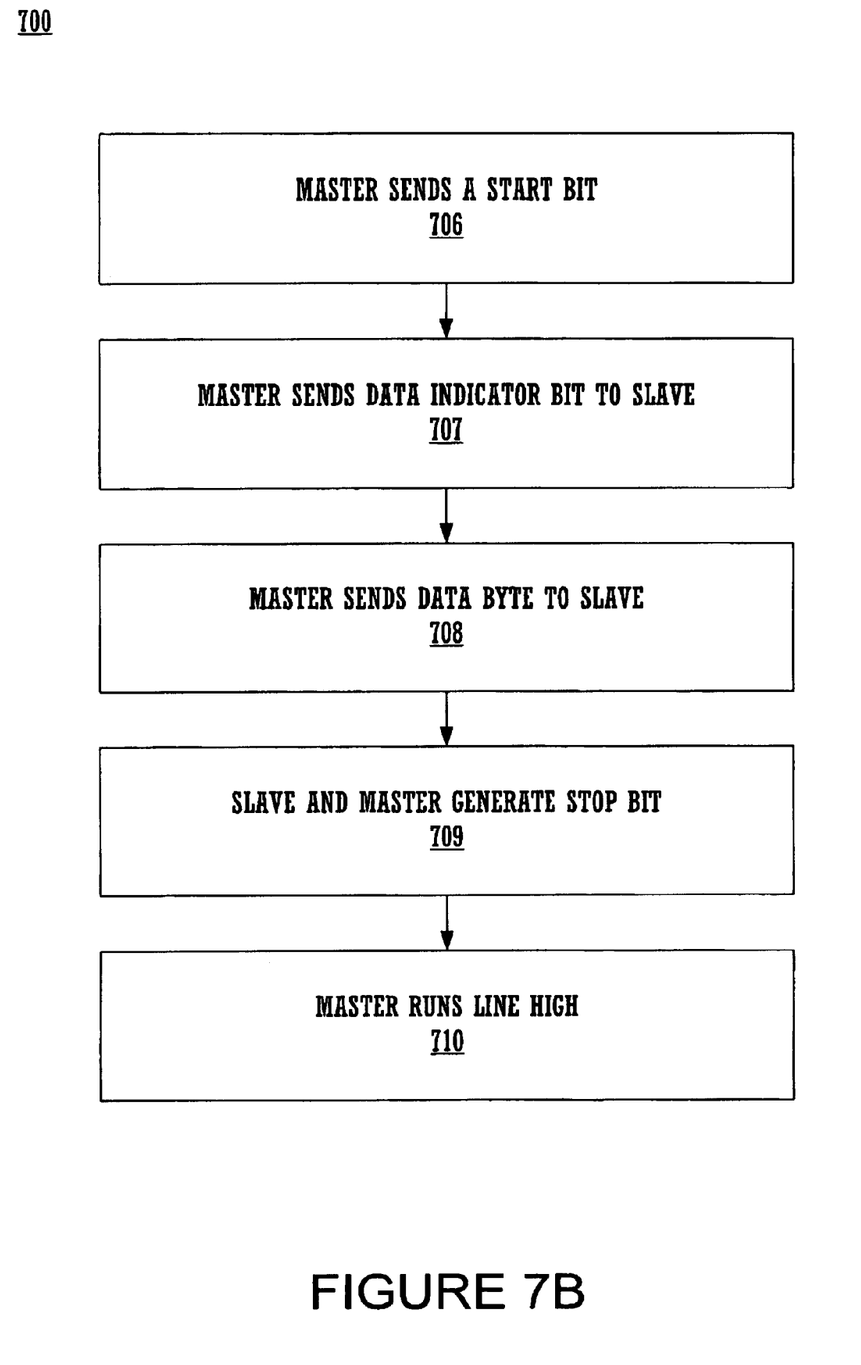

FIGS. 7A and 7B are a flowchart of a process 700 for bit interleaved serial data in accordance with one embodiment of the present invention. This process 700 shows the steps involved in an exemplary write operation. In step 701 of FIG. 7A, with reference also to FIG. 1, master device 110 asserts the single bi-directional data line high. This is the normal system state until master device 110 initiates communications. In step 702, master device 110 sends a start bit. By asserting the single bi-directional data line low, it signals to slave device 120 that a communications session is being initiated. In step 703, master device 110 sends the address indicator bit to slave device 120. This bit indicates to slave device 120 that the byte to follow is a memory address which will be accessed in some way by master device 110.

In step 704, master device 110 sends an address byte to slave device 120. This is the address to which slave device 120 will write a data bit. In this address byte is a read/write bit which tells slave device 120 that a write operation will occur at the designated memory location. It should be noted that while master device 110 is sending the address, slave device 120 is also sending a byte to master device 110. These bytes are interleaved on a bit level so that the two way communication is occurring simultaneously. The byte from slave device 120 may be data from a previous command, or dummy data. In step 705, slave device 120 and master device 110 generate a stop bit. After slave device 120 has sent its last bit, both slave device 120 and master device 110 drive the data line high for one bit period to generate a stop bit.

Referring to FIG. 7B, in step 706, master device 110 sends another start bit to slave device 120. This is to signal to slave device 120 that a communications session is being initiated. In step 707, master device 110 sends a data indicator bit to slave device 120. This bit indicates that the following byte is data which will be written to the memory address previously sent. In step 708, master device 110 sends a data byte to slave 120. This data is bit interleaved with dummy data sent by slave device 120 and will be written to the memory address previously sent. In step 709, slave device 120 and master device 110 generate a stop bit. After slave device 120 has sent its last byte, both slave device 120 and master device 110 drive the data line high for one bit period to indicate a stop bit. In step 710, master device 110 runs the data line high again. This is the normal system state until master device 110 is ready to initiate communication again.

Figure 8A:
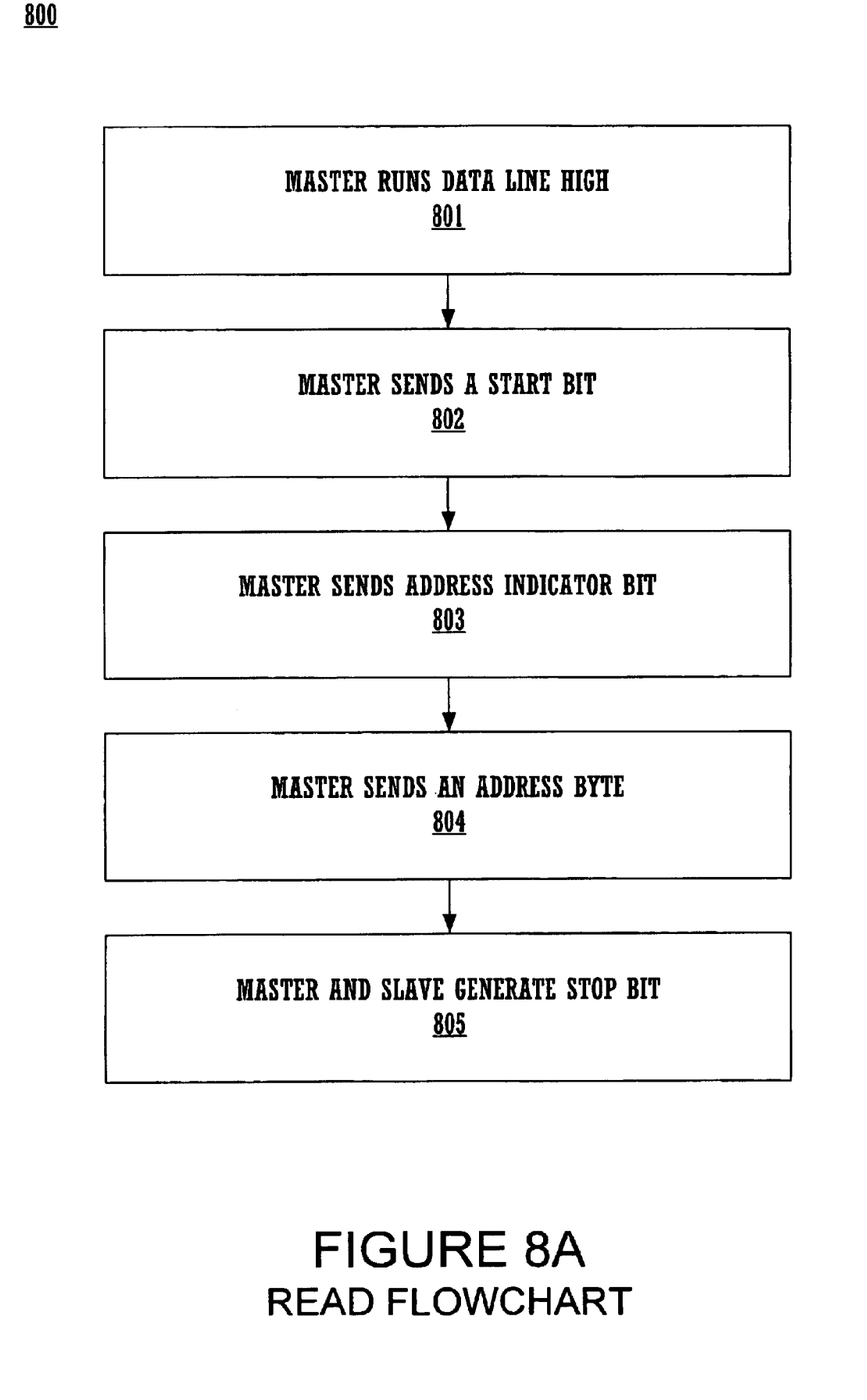
FIGS. 8A and 8B are a flowchart of the steps involved in a single read address command in accordance with an embodiment of the present invention.
Figure 8B:
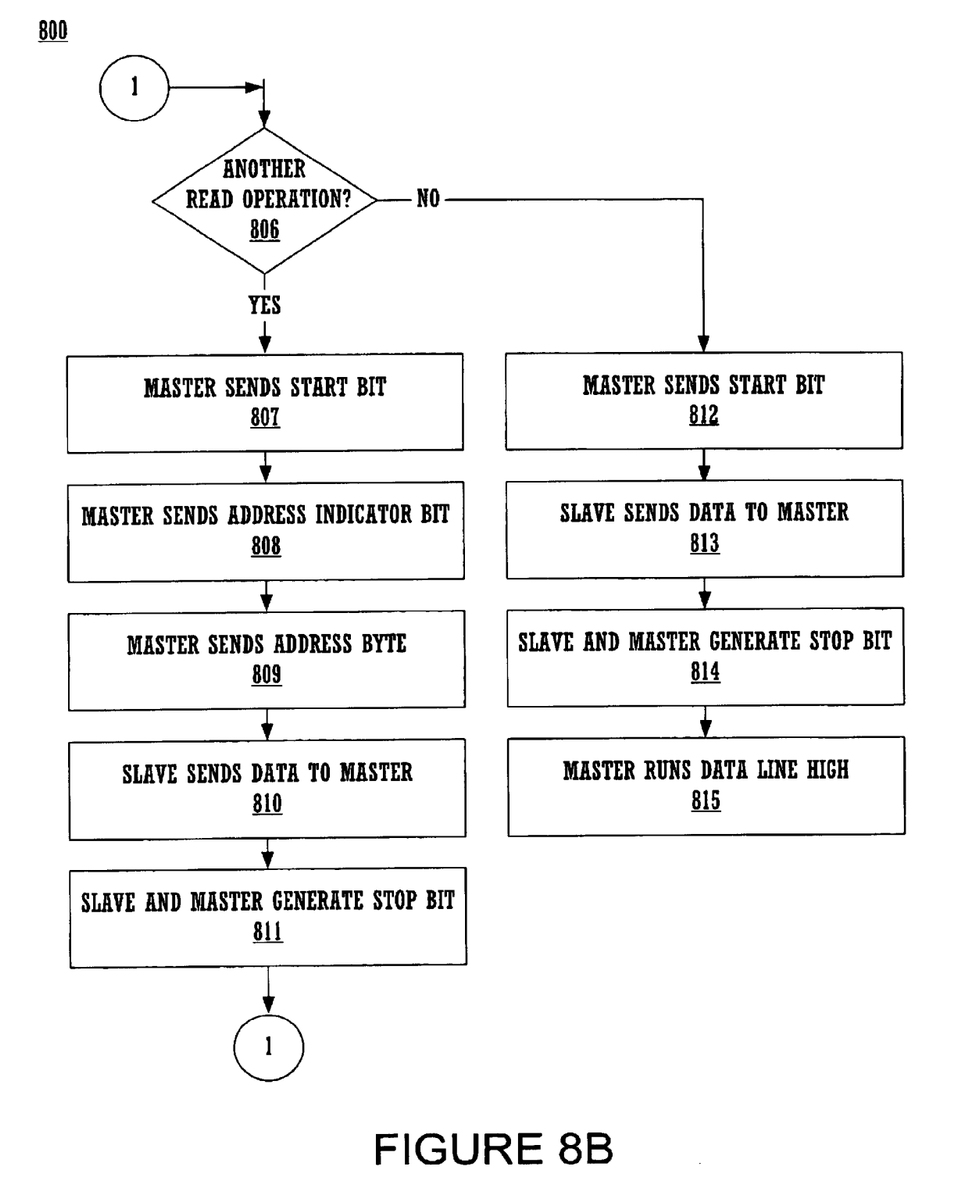

FIGS. 8A and 8B are a flowchart of process 800 for bit interleaved serial data in accordance with one embodiment of the present invention. This process 800 shows the steps involved in a read operation. In step 801 of FIG. 8A, with reference also to FIG. 1, master device 110 runs the data line high. This is the normal system state until master device 110 initiates communication. In step 802, master device 110 sends a start bit to slave device 120. This is to indicate to slave device 120 that a communications session is being initiated. In step 803, master device 110 sends an address indicator bit to slave device 120. This bit indicates to slave device 120 that the byte to follow is a memory address which will be accessed in some way by master device 110. In step 804, master device 110 sends an address byte to slave device 120. This byte includes an indicator bit which tells slave device 120 that a read operation is being performed. This byte is bit interleaved with a byte from slave device 120 which can be data from a previous command or dummy data. In step 805, slave device 120 and master device 110 generate a stop bit. After slave device 120 has sent its last bit, both slave device 120 and master device 110 run the data line high for one bit period to indicate a stop bit.

At this point, as shown in step 806 of FIG. 8B, one of two alternatives can occur. If there is another read operation to follow, the flowchart proceeds to step 807, if not, the flowchart proceeds to step 812. In step 807, the master device 110 sends another start bit to slave device 120. This is to signal to slave device 120 that a communications session is being initiated. In step 808, master device 110 sends an address indicator bit to slave device 120. This indicates to slave device 120 that a memory address is about to be sent, not a data byte. In step 809, master device 110 sends an address byte to slave device 120. This indicates a memory area in slave device 120 that will be accessed by master device 110. It should be pointed out that this address byte has an indicator bit that tells slave device 120 that a read operation is being performed. Again, this address byte is bit interleaved with a data byte from slave device 120. This data byte from slave device 120 is the data requested by master device 110 in the previous communication. After slave device 120 sends its last bit of data, it and master device 110 run the data line high for one bit period to indicate a stop bit. At this point, the flowchart returns to step 806 to determine whether another read operation is required.

If no further read operations are needed, the flowchart proceeds to step 812. In step 812, master device 110 sends a start bit to slave device 120. This is to indicate to slave device 120 that a communications session is being initiated. In step 813, slave device 120 sends a data byte to master device 110. It should be noted that this byte is the data requested by master device 110 when it sent its previous read command. This data is bit interleaved with a byte from master device 110, either another command or dummy data. In step 814, slave device 120 and master device 110 generate a stop bit. After sending its last bit, slave device 120 and master device 110 run the data line high for one bit period to generate a stop bit. In step 815, master device runs the data line high. This is the normal system state when no communications are initiated.

The preferred embodiment of the present invention, a bit interleaved single data line data serial interface, is thus described. While the present invention has been described in particular embodiments, it should be appreciated that the present invention should not be construed as limited by such embodiments, but rather construed according to the below claims.

What is claimed is:

1. A communication system comprising:
   a) a single system clock line;
   b) a single serial data line, operable for bi-directional data transfer; and
   c) a first device and a second device, operable to perform bit interleaved communication with each other, said devices coupled to said system clock line and said single serial data line, wherein said bi-directional data transfer comprises of simultaneous bit interleaved transfer between said first and second devices, and wherein each of said devices further comprises:
   an output enabler, coupled to said data line, operable for controlling bit interleaved data transmission and reception;
   a clock divider, coupled to said system clock line, operable for regulating said receiving and transferring of data; and
   a shift register, coupled to said clock divider and said output enabler, operable for receiving bit interleaved data and transferring byte data to and from a memory area.

2. The system of claim 1, wherein said clock divider regulates, said shift register at a fraction of the system clock frequency.

3. The system of claim 1, wherein said transfer of data is initiated by said first device.

4. The system of claim 1, wherein said second device sends bit interleaved data in response to said first device.

5. The system of claim 1, wherein said data transfer is initiated asynchronously with regard to said system clock.

6. The system of claim 5, wherein said data transfer is synchronous with regard to said system clock.

7. The system of claim 1, wherein said serial data line is tri-stated after each transmission of a data bit.

8. A method of device communication comprising the steps of:
   a) generating a start bit from a first device to a second device over a single bi-directional data line;
   b) sending an address/data indicator bit from said first device to said second device;
   c) sending an address byte from said first device to said second device, wherein an address bit from said first device is bit interleaved over said data line with a data bit from said second device;
   d) sending a data byte from said first device to said second device, wherein a data bit from said first device is bit interleaved over said data line with a data bit from said second device; and
   e) sending a data byte from said second device to said first device, wherein a data bit from said second device is interleaved with a data bit from said first device.

9. The method of claim 8, wherein said start bit is generated asynchronously with regard to a common system clock.

10. The method of claim 9, wherein said sending of said data byte of steps d) and e) is synchronous with regard to said common system clock.

11. A method of performing communication comprising the steps of:
    a) a first device initiating communication with a second device over a one line serial bi-directional communication link;
    b) said first device sending a bit interleaved first command to a second device over said one line serial communication link, wherein said first and second device receive a common clock signal;
    c) said second device sending a bit interleaved response to said first command of said first device; and
    d) said first device sending a bit interleaved second command to said second device, wherein said steps c) and d) are performed simultaneously over said one line bi-directional serial communication link.

12. A method as described in claim 11, wherein said step b) comprises the step of said second device serially receiving said bit interleaved first command, one bit at a time, into a shift register of said second device and using a parallel write operation to store said first command into a memory of said second device.

13. A method as described in claim 11, wherein said step c) comprises the step of said first device serially receiving said bit interleaved response, one bit at a time, into a shift register of said first device and using a parallel write operation to store said first command into a memory of said first device.

14. A method as described in claim 11, further comprising the step of dividing down said system clock to provide a data frequency for bit interleaved transmissions of said steps b)–d).

15. A method as described in claim 11, wherein said first command is a first memory address of said second device.

16. A method as described in claim 11, wherein said response is a data word stored in said first memory address.

17. A method as described in claim 15, wherein said second command is a second memory address of said second device.

18. A method as described in claim 15, wherein said second command is a data word to be stored in a first memory address of said second device.

19. A method as described in claim 11, wherein said communication can be initiated asynchronously with regard to said system clock.

20. A method as described in claim 19, wherein steps b)–d) are performed synchronously with regard to said system clock.

* * * * *